(12) United States Patent
Goodhand

(10) Patent No.: US 11,414,178 B2
(45) Date of Patent: *Aug. 16, 2022

(54) BOUNDARY LAYER INGESTION FAN SYSTEM

(71) Applicant: ROLLS-ROYCE plc, London (GB)

(72) Inventor: Martin N. Goodhand, Bristol (GB)

(73) Assignee: Rolls-Royce plc

(*) Notice: Subject to any disclaimer, the term of this patent is extended or adjusted under 35 U.S.C. 154(b) by 393 days.

This patent is subject to a terminal disclaimer.

(21) Appl. No.: 16/672,606

(22) Filed: Nov. 4, 2019

(65) Prior Publication Data
US 2020/0156769 A1  May 21, 2020

(30) Foreign Application Priority Data

Nov. 16, 2018  (GB) ..................... 1818683

(51) Int. Cl.
*B64C 21/06* (2006.01)
*F01D 5/14* (2006.01)

(52) U.S. Cl.
CPC ............. *B64C 21/06* (2013.01); *F01D 5/141* (2013.01)

(58) Field of Classification Search
CPC ...................................................... B64C 21/06
See application file for complete search history.

(56) References Cited

U.S. PATENT DOCUMENTS

| | | | |
|---|---|---|---|
| 5,079,916 A * | 1/1992 | Johnson | F02K 3/072 416/129 |
| 5,957,661 A | 9/1999 | Hunt et al. | |
| 8,689,538 B2 * | 4/2014 | Sankrithi | B64D 27/12 60/226.1 |
| 10,000,293 B2 * | 6/2018 | Hamel | B64C 21/06 |
| 2003/0194327 A1 | 10/2003 | Bradbury et al. | |
| 2004/0136831 A1 * | 7/2004 | Barb | F01D 5/147 416/231 R |
| 2008/0206065 A1 | 8/2008 | Yamashita et al. | |
| 2015/0000252 A1 | 1/2015 | Moore et al. | |
| 2016/0138402 A1 | 5/2016 | Lentz | |
| 2016/0273547 A1 | 9/2016 | Gallagher et al. | |
| 2017/0297727 A1 | 10/2017 | Niergarth et al. | |

(Continued)

FOREIGN PATENT DOCUMENTS

| | | |
|---|---|---|
| CN | 201116540 | 9/2008 |
| EP | 3026214 | 6/2016 |

(Continued)

OTHER PUBLICATIONS

Great Britain search report dated May 14, 2019, issued in GB Patent Application No. 1818680.9.

(Continued)

*Primary Examiner* — Michael L Sehn
(74) *Attorney, Agent, or Firm* — Barnes & Thornburg LLP

(57) ABSTRACT

A boundary layer ingestion fan system for location aft of the fuselage of an aircraft is shown. It comprises a nacelle defining a duct, and a fan located within the duct. The fan comprises a hub arranged to rotate around a rotational axis (A-A) and a plurality of blades attached to the hub. A blade blockage, which is the ratio of the blade thickness to the product of the circumferential pitch and the cosine of a blade inlet angle ($t/s \cdot \cos\beta_1$), is 0.25 or greater at the 0 percent span position.

20 Claims, 16 Drawing Sheets

(56) References Cited

U.S. PATENT DOCUMENTS

| | | | |
|---|---|---|---|
| 2018/0050811 | A1 | 2/2018 | Niergarth et al. |
| 2018/0051716 | A1 | 2/2018 | Cheung et al. |
| 2018/0057182 | A1 | 3/2018 | Marrinan et al. |
| 2018/0086438 | A1 | 3/2018 | Pastouchenko et al. |
| 2018/0093777 | A1 | 4/2018 | Cheung |
| 2018/0127089 | A1 | 5/2018 | Welstead et al. |
| 2018/0209445 | A1 | 7/2018 | Tantot |
| 2018/0257787 | A1 | 9/2018 | Hamel et al. |
| 2018/0281931 | A1 | 10/2018 | Miller et al. |
| 2018/0283179 | A1 | 10/2018 | Gonzalez-Gutierrerz |

FOREIGN PATENT DOCUMENTS

| | | |
|---|---|---|
| EP | 3048042 | 7/2016 |
| EP | 3093235 | 11/2016 |
| EP | 3375713 | 9/2018 |
| EP | 3378780 | 9/2018 |
| EP | 3415437 | 12/2018 |
| EP | 3446962 | 2/2019 |
| FR | 3039213 | 1/2017 |
| GB | 2382382 | 5/2003 |
| GB | 2426295 | 11/2006 |
| GB | 2518942 | 4/2015 |
| GB | 2542184 | 3/2017 |
| WO | 2009103528 | 8/2009 |
| WO | 2018035206 | 2/2018 |

OTHER PUBLICATIONS

Great Britain search report dated May 14, 2019, issued in GB Patent Application No. 1818681.7.
Great Britain search report dated May 14, 2019, issued in GB Patent Application No. 1818682.5.
Great Britain search report dated May 15, 2019, issued in GB Patent Application No. 1818683.3.
Great Britain search report dated May 16, 2019, issued in GB Patent Application No. 1818684.1.
Great Britain search report dated May 16, 2019, issued in GB Patent Application No. 1818686.6.
Great Britain search report dated May 16, 2019, issued in GB Patent Application No. 1818687.4.
European search report dated Feb. 20, 2020, issued in EP Patent Application No. 19204329.
European search report dated Feb. 17, 2020, issued in EP Patent Application No. 19204330.
European search report dated Feb. 20, 2020, issued in EP Patent Application No. 19204331.
European search report dated Feb. 21, 2020, issued in EP Patent Application No. 19204332.
European search report dated Feb. 17, 2020, issued in EP Patent Application No. 19204333.
European search report dated Feb. 13, 2020, issued in EP Patent Application No. 19204335.
European search report dated Feb. 20, 2020, issued in EP Patent Application No. 19204336.

* cited by examiner

BOUNDARY LAYER INGESTION FAN SYSTEM

CROSS-REFERENCE TO RELATED APPLICATIONS

This application is based upon and claims the benefit of priority from British Patent Application No. GB 1818683.3, filed on 16 Nov. 2018, the entire contents of which are herein incorporated by reference.

BACKGROUND

Technical Field

This disclosure relates to boundary layer fan systems for aircraft.

Description of the Related Art

Boundary layer ingestion (often abbreviated to BLI) is a technique that may be used to improve aircraft propulsive efficiency by reducing downstream wake and jet mixing losses. In practice a designer must try and exploit this benefit without adding excessive weight, drag or inefficiency into the aircraft or propulsion system.

Whist in theory the maximum benefit arises if all the aircraft's boundary layers are ingested, in practice it is only practicable, without distributed propulsion, to ingest the boundary layers which are most concentrated. On a conventional tube and wing aircraft this means ingesting the fuselage boundary layer only. Fuselage BLI is therefore considered the most likely embodiment of BLI for the next generation of aircraft. Typically, in straight and level flight at optimum lift-drag ratio the fuselage drag is responsible for around 20 to 25 percent of the total aircraft drag.

The propulsive efficiency of an aircraft propulsion system relates the power input into the flow, $P_{flow}$ relative to the propulsive power which is the product of the thrust, T and the flight velocity, $v_\infty$:

$$\eta_p = \frac{P_{propulsive}}{P_{flow}} = \left(\frac{Tv_\infty}{P_{flow}}\right) \quad \text{[Equation 1]}$$

If all streams are evaluated at ambient pressure then the power into the flow is the difference between the kinetic energy of the jet and inlet streams:

$$P_{flow} = \tfrac{1}{2}\dot{m}(v_j^2 - v_i^2) \quad (2)$$

whilst the thrust is the difference between the jet and inlet momentum:

$$T = \dot{m}(v_j - v_i) \quad (3)$$

Combining Equations 2 and 3 with Equation 1 gives:

$$\eta_p = \frac{2}{\frac{v_i}{v_\infty} + \frac{v_j}{v_\infty}} \quad \text{[Equation 4]}$$

In a conventional engine where $v_i = v_\infty$, i.e. the inlet velocity is equal to the flight velocity, then the propulsive efficiency must be less than or equal to one ($\eta_p \le 1$). The limiting case of $\eta_p = 1$ occurs when the jet velocity matches the inlet velocity; however this is unachievable with a finite propulsor size that produces thrust.

In the case of BLI, $v_i < v_\infty$. With a depressed inlet velocity, the left-hand term in the denominator of Equation 4 reduces. The propulsive efficiency increases and can even exceed one. For a fixed specific thrust ($v_j - v_i$=constant), both terms in the denominator reduce. For a given inlet velocity, the propulsive efficiency increases further.

For the propulsive efficiency to exceed unity a dissipation that would otherwise have occurred must have been prevented. The origin of this dissipation can be seen by rearranging the above equations to obtain the lost efficiency, $(1-\eta_p)$:

$$1 - \eta_p = \frac{P_{dissipated}}{P_{flow}} \quad \text{[Equation 5]}$$

$$= \left(\frac{\tfrac{1}{2}(v_j - v_\infty)^2 - \tfrac{1}{2}(v_i - v_\infty)^2}{P_{flow}}\right)$$

Equation 5 may be interpreted with and without boundary layer ingestion.

In the case of a conventional engine where $v_i = v_\infty$, only the left-hand term is non-zero. The lost work is therefore the kinetic energy excess that is dissipated in the jet downstream.

In the case of BLI where $v_i < v_\infty$, the right-hand term is now non-zero due to a depressed inlet velocity. This represents prevention of dissipation that would otherwise have occurred in the wake. Again, for a fixed specific thrust ($v_j - v_i$=constant) the left-hand term also reduces whilst $v_j > v_\infty$.

Whilst significant simulation and prediction has been performed in multiple research programmes to quantify the theoretical benefit of BLI, little published work to date has investigated the required aerodynamic design of a turbomachine that may be used in a fuselage BLI installation on a conventional tube-and-wing aircraft.

SUMMARY

In an aspect, there is provided a boundary layer ingestion fan system for location aft of the fuselage of an aircraft, comprising:
  a nacelle defining a duct;
  a fan located within the duct, the fan comprising a hub arranged to rotate around a rotational axis and a plurality of blades attached to the hub, each of which has
  a span from a root at the hub defining a 0 percent span position ($r_{hub}$) to a tip defining a 100 percent span position ($r_{tip}$) and a plurality of span positions therebetween ($r \in [r_{hub}, r_{tip}]$), and
  a leading edge and a trailing edge defining, for each span position, a chord therebetween having a chord length (c);
  a blade thickness (t) defined for each span position thereof which is normal to said chord and which is defined as a maximum distance between a pressure surface and a suction surface of each blade,
  a blade inlet angle ($\beta_1$) at each span position which is the angle of a camber line at the leading edge relative to the rotational axis;
  wherein a circumferential pitch (s) is defined at each span position between each one of said plurality of blades;
  wherein a blade blockage, which is the ratio of the blade thickness to the product of the circumferential pitch and the cosine of a blade inlet angle (t/s·cosβ$_1$), of 0.25 or greater at the 0 percent span position.

Such a fan exhibits the requisite distortion tolerance encountered in such an installation.

DESCRIPTION OF THE DRAWINGS

Embodiments will now be described by way of example only with reference to the accompanying drawings, which are purely schematic and not to scale, and in which.

DETAILED DESCRIPTION

Figure 1:
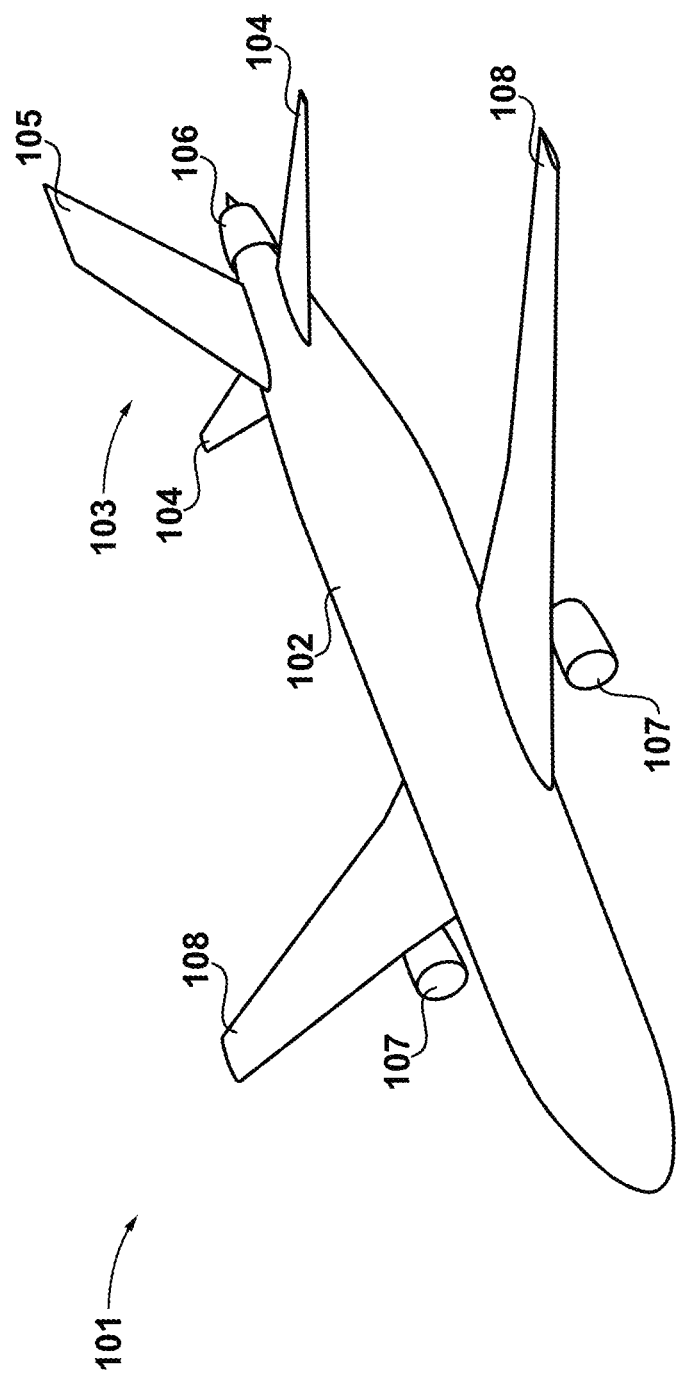
FIG. 1 shows an aircraft incorporating a BLI fan system according to the invention.

A tube-and-wing-configuration aircraft 101 according to an embodiment is shown in FIG. 1.

In the present example, the aircraft 101 comprises a fuselage 102 with a conventional empennage 103 mounted thereto. Thus, both the tailplane 104 and vertical stabiliser 105 are mounted to the fuselage 102. The aircraft 101 further comprises a BLI fan system 106 mounted aft of the fuselage 103 and the empennage 103. In the present example the aircraft 101 is a twinjet and thus comprises two turbofan engines 107 mounted under a respective wing 108. It will be appreciated however that a greater number of engines may be provided depending upon the aircraft configuration. Further, a different engine configuration such as open rotor may be used.

Figure 2:
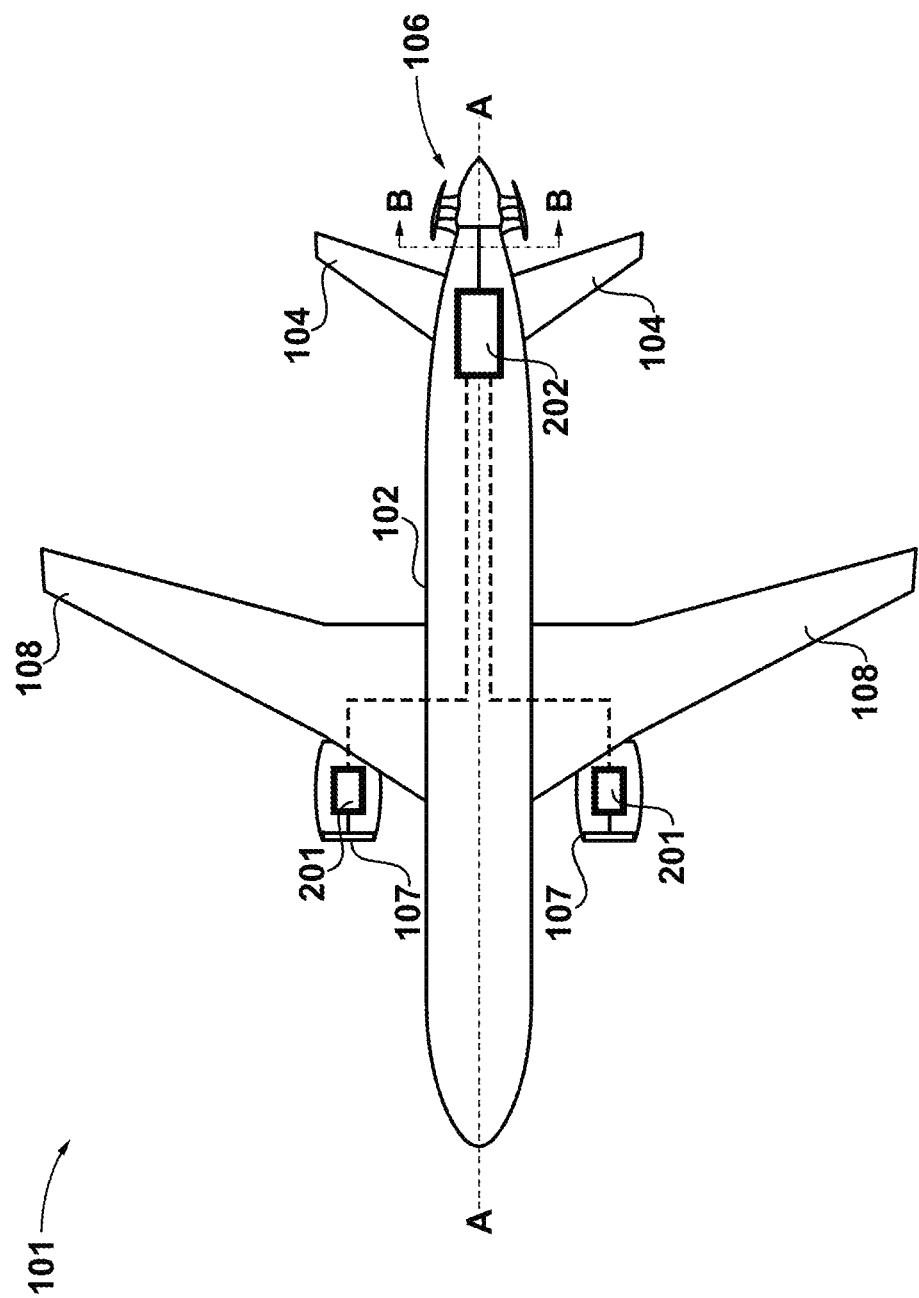
FIG. 2 is a schematic of the propulsion system in the aircraft of FIG. 1.

A schematic of the propulsion system of the aircraft 101 is shown in FIG. 2.

In the present example, the BLI fan system 106 comprises a fan that is electrically-driven. The turbofan engines 107 therefore each comprise an electric machine 201 configured to generate electrical power for distribution to an electric machine 202 to drive the BLI fan system 106. In the present example, each electric machine 201 is configured to generate 1 megawatt of electrical power for the BLI fan system 106. In the present example, the electric machine 202 is configured to drive the BLI fan system 106 with 2 megawatts of electrical power.

It will be appreciated that in other embodiments alternative sources of electrical power, such as batteries, fuel cells, etc. may be provided in addition to or in place of the electric machines 201.

Further, it will be appreciated that in other embodiments different amounts of electrical power may be produced by the electric machines 201 to, for example, power services on the aircraft 101. Additionally, in other embodiments the electric machine 202 may be configured to drive the BLI fan system 106 with different amounts of power, such as greater than 2 megawatts or less than 2 megawatts depending upon the design point.

In the present example, the BLI fan system 106 shares its rotational axis A-A with the centreline of the aircraft 101 in the plane of FIG. 2.

Figure 3:
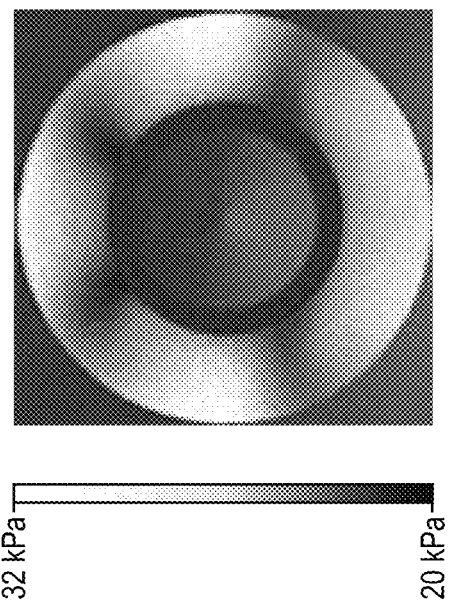
FIG. 3 shows the pressure field at B-B of FIG. 2, which is immediately upstream of the BLI fan system.

FIG. 3 shows the pressure field during cruise at B-B of FIG. 2. As shown in the legend, the lightest shade corresponds to an absolute total pressure of 32 kilopascals, whilst the darkest shade corresponds to an absolute total pressure of 20 kilopascals. The image of FIG. 3 was generated by application of computational fluid dynamics to a three-dimensional model of the aircraft 101.

The non-uniformity of the pressure distribution is due to the configuration of the empennage 103. Whilst a T-tail empennage may reduce the variation around below the 3 and 9 o'clock positions, this would come with all of the attendant disadvantages of such a configuration in terms of risk of entering deep stall, greater weight, lack of maintainability, etc. Further, there would still be a large degree of variation in the pressure field at the 12 o'clock position due to the continued presence of a vertical stabiliser.

Thus it is clear in view of the analysis of the pressure field immediately upstream of the BLI fan system 106 that, in addition to being located in a low velocity stream, it must also tolerate a high degree of distortion.

Figure 4B:
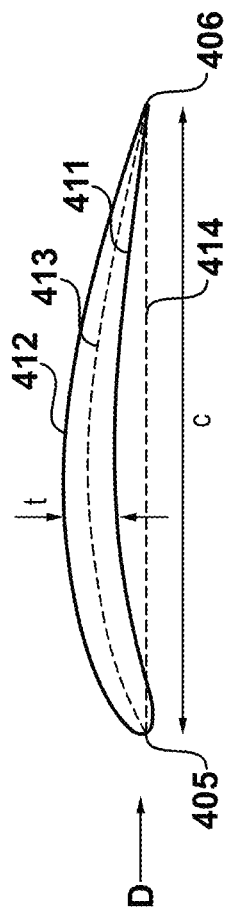
FIGS. 4A, 4B, and 4C set out the nomenclature used herein for the parameters of the BLI fan system.
Figure 4C:
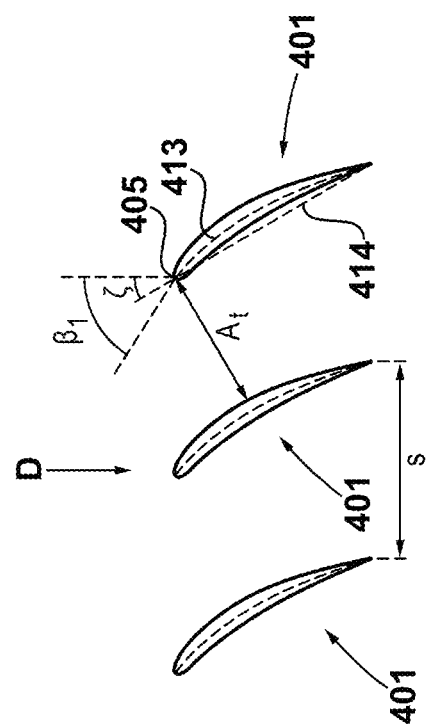
Figure 4A:
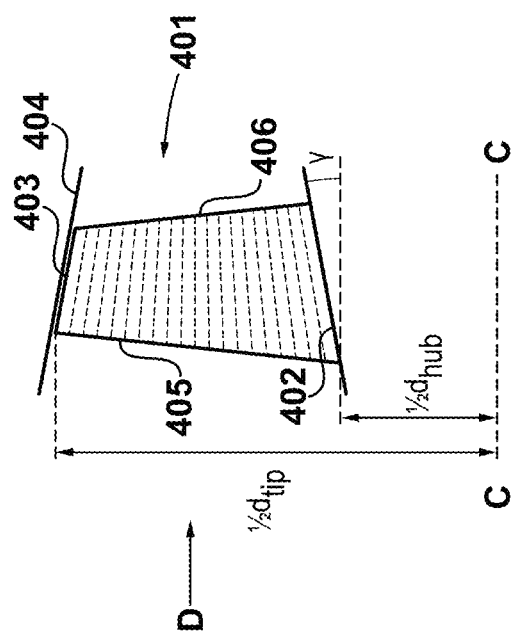

In order to assist the reader, FIGS. 4A, 4B, and 4C set out the nomenclature that will be used to describe the design parameters of the fan in the BLI fan system 106. Reference is made in these Figures to the properties of a purely exemplary blade 401 which could form part of a turbomachine rotor stage. It will be appreciated that these Figures are purely to aid the reader and are not representative of any embodiments.

FIG. 4A is a meridional view of the exemplary blade 401. In use, the blade 401 rotates around a rotational axis C-C. The blade 401 extends in span from a root at a hub 402 to a tip 403 adjacent an end wall 404.

The hubline of the hub 402 has a hade angle γ relative to the direction of the rotational axis C-C. In the present example, considering a flow in the direction of arrow D, the hub 402 has a positive hade angle γ which is typical for compressors. Further, it will be seen that the end wall 404 falls in the direction of arrow D, again this is typical for compressors. Given the flow in the direction of arrow D, the blade 401 has a leading edge 405 and a trailing edge 406.

The blade 401 has a plurality of span positions r defined between the hub 402 at a 0 percent span position, i.e. r=0, and the tip 403 at a 100 percent span position, i.e. r=1. Thus all span positions r of the blade 401 are between 0 percent and 100 percent span, i.e. r∈[0, 1]. As shown in the Figure, the dashed lines on the blade 401 indicate lines of constant span r=0, 0.05, 0.1 . . . 1. Thus, as used herein, a particular span position r may vary in actual radial distance from the rotational axis C-C with axial position, due to hub hade angle γ and the profile of the tip 403 to conform with the end wall 404. This is conventional.

In the present example, the hub-tip ratio of the rotor stage is defined by the ratio of the diameter of the hub 402 at the leading edge 405 (daub), to the diameter of the tip 403 at the leading edge 405 ($d_{tip}$), i.e. $d_{hub}/d_{tip}$.

FIG. 4B shows a cross section of the blade 401 in the axial-circumferential plane at a particular span position r.

The blade 401 has a pressure surface 411 and a suction surface 412. The pressure surface 411 and the suction surface 412 define a camber line 413 halfway therebetween extending from the leading edge 405 to the trailing edge 406. A chord 414 is defined as a straight line connecting the ends of the camber line 413. The chord 414 has a chord length c. The blade 401 has a maximum thickness t, which is normal to the chord 414 and which is the maximum distance between the pressure surface 411 and the suction surface 412.

It will be appreciated that the chord length c and thickness t and the shape of the camber line 413 may vary with span r.

FIG. 4C shows a cascade of three blades 401 forming part of the same rotor stage at a particular span position r.

A blade inlet angle $β_1$ is defined as the angle between the axial, defined by the rotational axis C-C, and the angle of the camber line 413 at the leading edge 405 of the blade 401. A stagger angle ζ is defined as the angle between the axial and the chord 414. A pitch s is defined as the circumferential distance between the camber lines 413 of each blade 401. A solidity σ is defined as the ratio of chord length to pitch, i.e. c/s. A throat area $A_t$ is defined as the distance between the chord 414 of each blade in the cascade, in the direction perpendicular to the chord 414.

Figure 5:
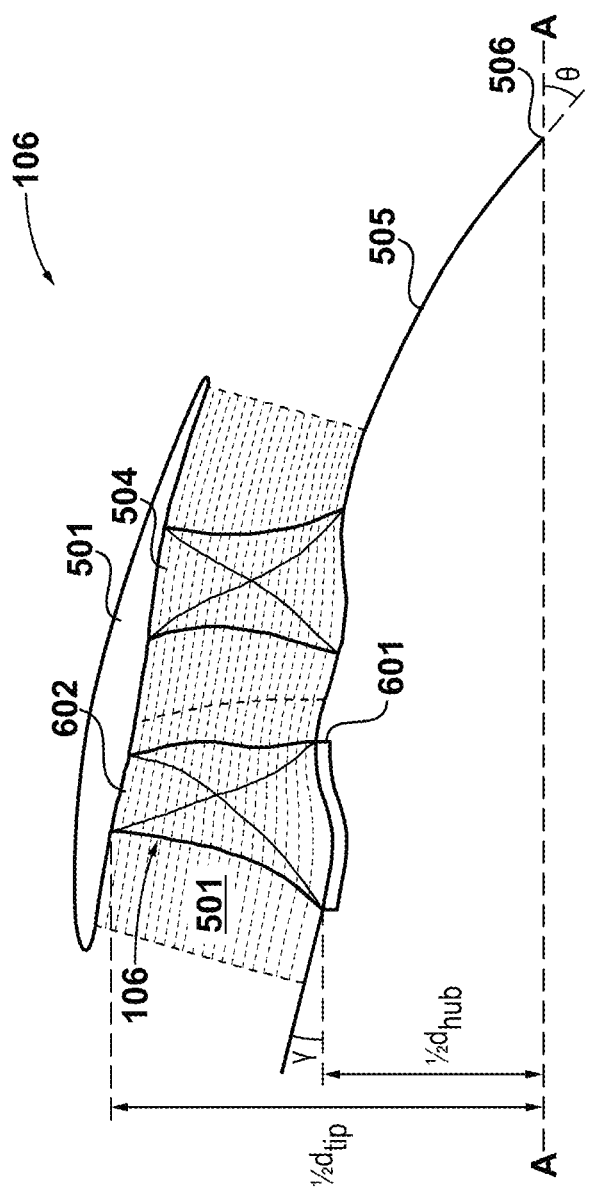
FIG. 5 is a meridional view of the gas path an embodiment of the BLI fan system.

A meridional view of an embodiment of the BLI fan system 106 is shown in FIG. 5. In the present example the BLI fan system 106 is substantially axisymmetric around axis A-A.

The BLI fan system 106 comprises a nacelle 501 which defines a duct 502. Boundary layer flow from the fuselage 102 enters the duct 502 in the direction of arrow E. A fan 503 is located within the duct 502. Details of the drive arrangement for the fan are omitted for clarity. In this example, an outlet guide vane set 504 is also provided and in a specific embodiment provide a structural support for the nacelle 501. Dashed lines indicating constant span positions r are included.

In the present embodiment, the annulus lines of the duct 502 in the region of the outlet guide vane set 504 forms a contracting exit nozzle for the BLI fan system 106. In this way, the flow is accelerated over the outlet guide vanes. This can substantially reduce losses therein by keeping the flow attached. Such an approach cannot normally be taken in a typical turbofan due to the location of the gas turbine core radially inward of the bypass duct.

Figure 6:
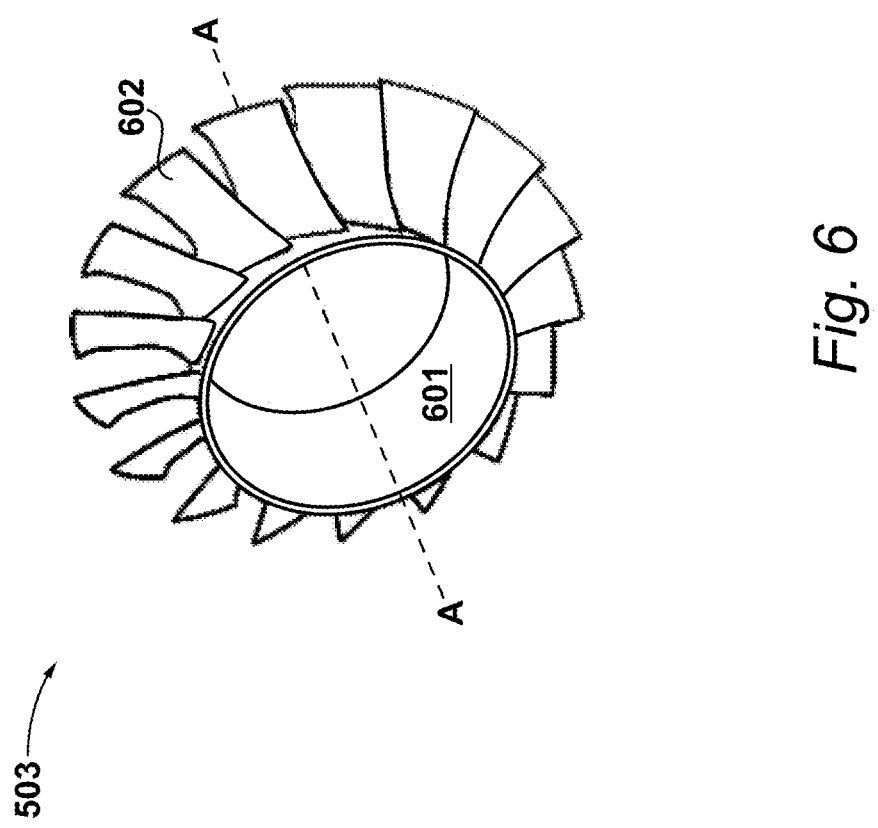
FIG. 6 is a 3D projection of an embodiment of the fan of the BLI fan system.

Referring briefly to FIG. 6, which illustrates a specific embodiment of the fan 503, the fan has a hub 601 that is arranged to rotate around axis A-A, and a plurality of identical fan blades 602 attached to the hub 601.

Referring again to FIG. 5, in the present embodiment the hade angle γ of the hub 601 at an axial position coincident with the leading edge of the fan blades 602 is negative, i.e. it has a falling hubline. In a specific embodiment, the hade angle γ is set to match the boat tail angle of the fuselage 102.

In a specific embodiment, the hade angle γ is between −10 and −20 degrees with respect to the rotational axis A-A. It will be appreciated by those skilled in the art that the hade angle γ in a turbofan is almost always positive over the full axial extent of the root of the fan blades therein. However, in the present embodiment of the BLI fan system 106, it is advantageous to have a negative hade angle γ as shown in FIG. 5 to prevent separation of the boundary layer upstream of the face of the fan 503.

In the present embodiment, the fan blades 602 employ leading edge sweep to reduce the loading in the hub.

In an embodiment, the hub-tip ratio of the fan 503 is from 0.45 to 0.55. This is substantially greater than typical turbofan fans, where the hub-tip ratio is typically less than 0.3. The higher hub-tip ratio of the fan 503 increases the blade speed in the hub for a fixed tip Mach number, which reduces hub diffusion to tolerable levels in this application. In the specific embodiment of FIG. 5, the hub-tip ratio of the fan 503 is 0.5.

In the present embodiment, there is further provided an afterbody 505 axially downstream of the nacelle 501. The afterbody 505 tapers to an apex 506 at the rotational axis A-A. In an embodiment, the apex angle θ of the afterbody 505, which is the angle the afterbody makes with the rotational axis A-A at the apex 506, is from 35 to 45 degrees. This is substantially higher than found in gas turbines, and allows for a much shorter, and therefore less lossy and lighter afterbody. This is tolerable due to the lower Mach numbers at the exit of the duct 502 than would be found in a gas turbine engine where the flow over the afterbody emanates from the low-pressure turbine exit. In the specific embodiment of FIG. 5, the apex angle θ is 40 degrees.

Figure 7C:
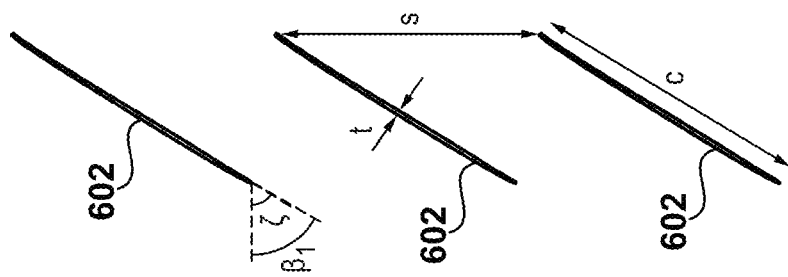
FIGS. 7A, 7B, and 7C show blade cascades of the fan at 0 percent span, 50 percent span, and 100 percent span respectively.
Figure 7B:
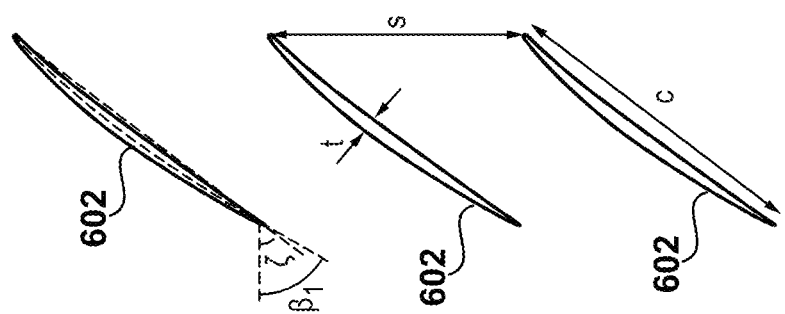
Figure 7A:
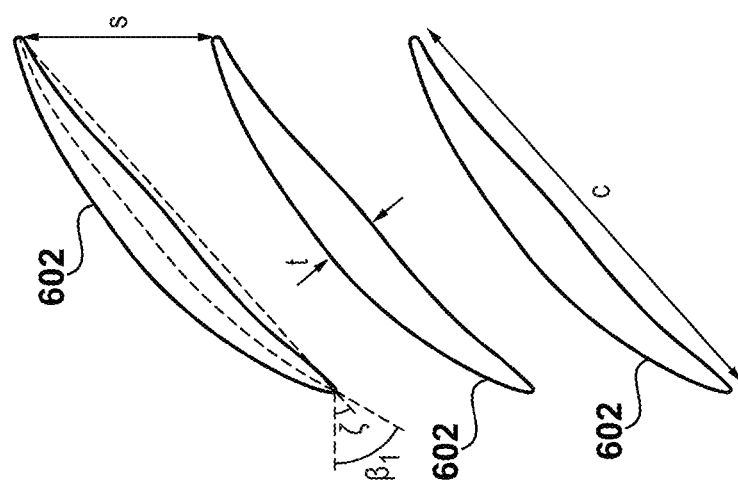

FIGS. 7A, 7B, and 7C illustrate a cascade of the fan blades 602 at, respectively, 0 percent span (r=0), 50 percent span (r=0.5), and 100 percent span (r=1).

For the fan blades 602, as shown in FIG. 7A, the blade blockage, which is the ratio of the blade thickness to the product of the circumferential pitch and the cosine of a blade inlet angle ($t/s·\cos β_1$), is set to 0.25 or greater at the 0 percent span position. This achieves distortion tolerance for the inlet distortion seen by the fan.

Optionally, the blade blockage is 0.4 or greater at the 0 percent span position. The blade blockage may be 0.5 or greater at the 0 percent span position. The blade blockage may be 0.6 or greater at the 0 percent span position. Whilst it will be appreciated that higher degrees of blade blockage reduce the efficiency of the fan 503, the higher levels of blockage improve the distortion tolerance and ability to tolerate the amount of forcing on the blades.

Further improvements may be achieved with a blade blockage of 0.25 or greater between the 0 and 25 percent span positions. Additionally or alternatively the blade blockage may be 0.4 or greater between the 0 and 10 percent span positions.

Figure 8:
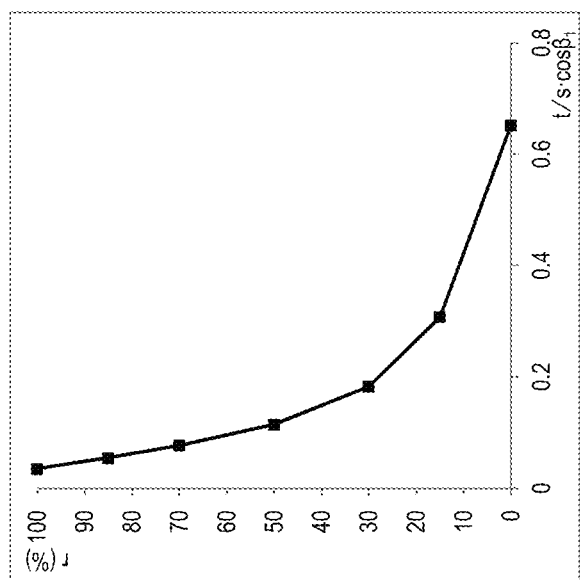
FIG. 8 is a plot of blade blockage with respect to span (r)

FIG. 8 is a plot of the blade blockage, $t/s·\cos β_1$ with respect to the full range of span positions r for the specific embodiment of the fan 503. Further features may be employed to improve the performance of the fan 503.

Referring to FIG. 7A, in an embodiment the fan blades 602 have a stagger angle at the 0 percent span position, $ζ_{hub}$ of 40 degrees or greater. This is compared to a typical turbofan fan blade which will tend to have a much lower or indeed zero stagger at the root to, amongst other things, reduce the inlet relative Mach number. However, as described with reference to FIG. 3, the pressure distribution of the inlet flow for the BLI fan system 106 is markedly different to the freestream flow encountered by a turbofan in a traditional under-the-wing installation. Thus, such a high level of stagger angle at the root is specified in the present embodiment to increase the distortion tolerance of the fan 503 by making its characteristics steeper and damping out the variations in inlet stagnation pressure. Such levels of stagger are acceptable as the axial velocity of the boundary layer along the fuselage 102 of the aircraft 101 is very low.

In order to reduce losses due to high relative Mach numbers during operation, in an embodiment the stagger angle at the 0 percent span position, $\zeta_{hub}$ is chosen to be 60 degrees or less (down to the 40 degree minimum specified above).

As exemplified in FIGS. 7B and 7C, in an embodiment the condition of the stagger angle $\zeta$ being 40 degrees or greater is maintained for the full span of the blade. FIGS. 7B and 7C also exemplify the possibility of the condition of the stagger angle being 60 degrees or less being maintained for the full span of the blade.

Figure 9:
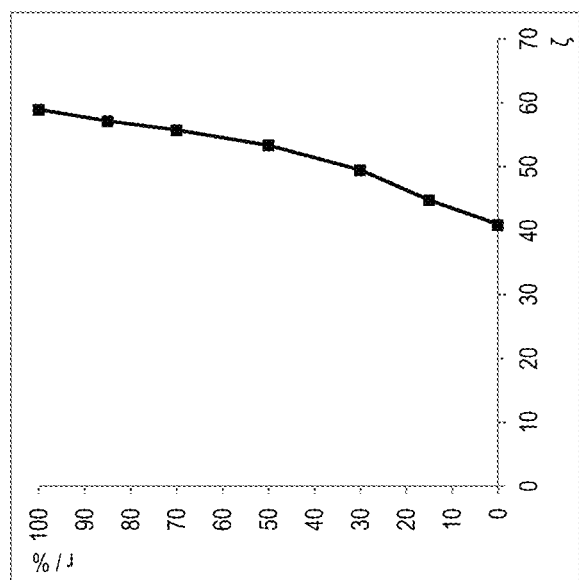
FIG. 9 is a plot of the stagger angle (ζ) of each blade on the fan with respect to span (r)

FIG. 9 is a plot of the stagger angle $\zeta$ with respect to the full range of span positions r for a specific embodiment of the fan blade 602.

Referring again to FIG. 7A, in an embodiment the ratio of the chord length at the 0 percent span position, $\zeta_{hub}$ to the chord length at the 100 percent span position, $c_{tip}$ may be one or greater. This further assists in terms of improving distortion tolerance. It should be noted that this is markedly different from a typical modern turbofan fan blade in which the ratio of $c_{hub}$ to $c_{tip}$ is significantly less than unity due to the use of wide chord blades and the relatively benign pressure distribution.

Referring again to FIGS. 7A and 7C, it may be observed that in this specific embodiment the ratio of $c_{hub}$ to $c_{tip}$, is 1.25 or greater. In particular it is 1.33 times greater. Further, embodiments of the fan blades 602 may observe the condition that the ratio of chord lengths, c between the 0 and 25 percent span positions to $c_{tip}$ be one or greater. This further improves distortion tolerance.

In an embodiment, the ratio of chord lengths, c between the 75 and 100 percent span positions to $c_{tip}$ is one or less.

Figure 10:
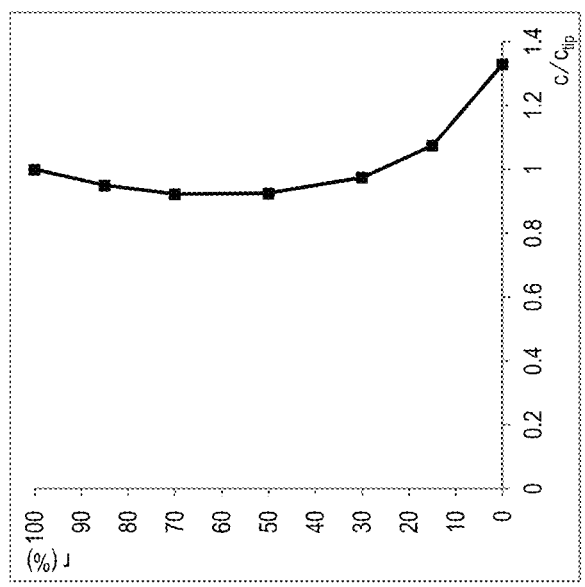
FIG. 10 is a plot of the ratio of chord length (c) to tip chord length (c$_{tip}$) of each blade on the fan with respect to span (r)

FIG. 10 is a plot of the ratio of c to $c_{tip}$ with respect to the full range of span positions r for a specific embodiment of the fan blade 602.

Figure 11:
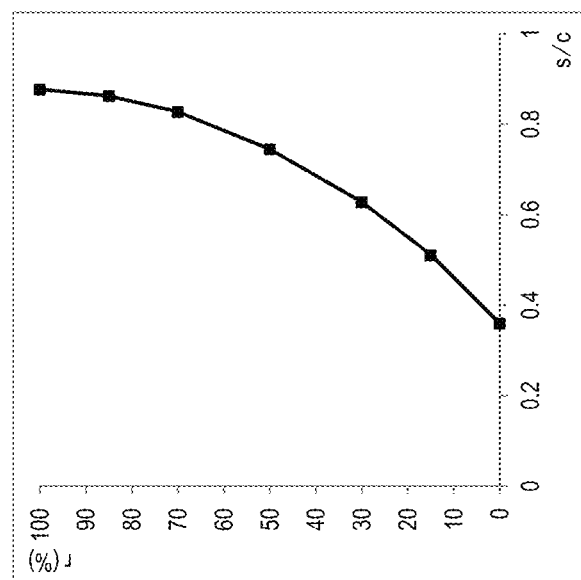
FIG. 11 is a plot of the ratio of pitch (s) to chord length (c) with respect to span (r)

FIG. 11 is a plot of ratio of pitch, s to chord length, c with respect to the full range of span positions r for the specific embodiment of the fan 503 illustrated in FIG. 6. This specific embodiment has nineteen fan blades 602 which, along with the hub-tip ratio and overall diameter of the fan 503, sets the pitch s for a given span position r.

The ratio of s to c is low at the 0 percent span position, which indicates that there will be a degree of interference between each blade. However, towards the tip the ratio of s to c tends towards unity which indicates lower interference. The choice of distribution in this manner optimises distortion tolerance and efficiency.

Referring to FIG. 7A, the fan blades 602 have a ratio of blade thickness at the 0 percent span position, $t_{hub}$ to chord length at the 0 percent span position, $c_{hub}$ of 0.1 or greater. This may be observed in FIG. 7A. This improves the amount of forcing that the blades can withstand.

In an embodiment, the ratio of blade thickness at the 100 percent span position, $t_{tip}$ to chord length at the 100 percent span position, $c_{tip}$ is 0.02 or less. This may be observed in FIG. 7C. This reduces losses and improves efficiency.

Figure 12:
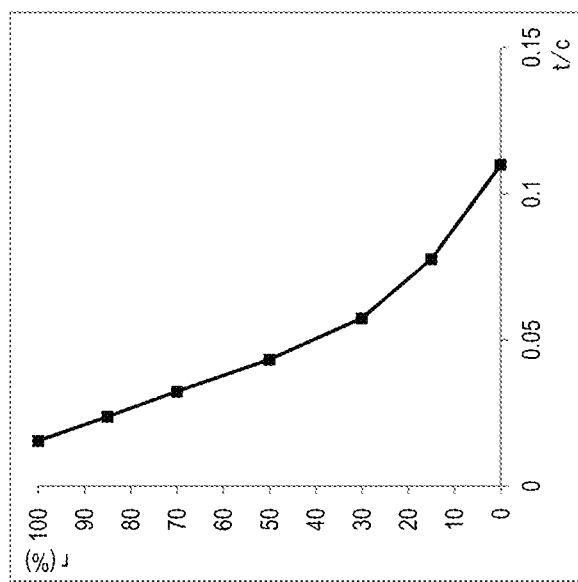
FIG. 12 is a plot of the ratio of blade thickness (t) to chord length (c) of each blade on the fan with respect to span (r)

FIG. 12 is a plot of the ratio of blade thickness, t to chord length, c with respect to the full range of span positions r for a specific embodiment of the fan blade 602.

Figure 13:
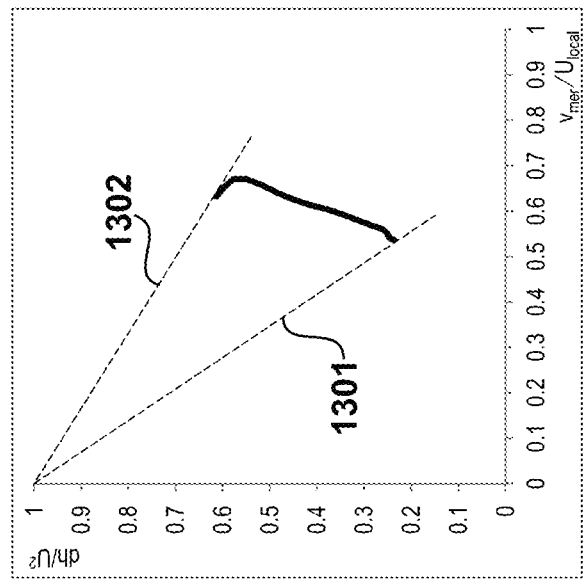
FIG. 13 is a Smith chart for the fan of FIG. 5.

The present embodiment of the fan 503 brings together the full set of the geometric parameters set out in FIGS. 8 to 12. The design point for the fan 503, given a freestream Mach number of 0.85, a tip axial Mach number of 0.6, a tip work coefficient $dh/U_{tip}^2$ of 0.188, and a constant spanwise pressure ratio of 1.384 to reduce the duty on the hub sections of the blades. A Smith chart for the fan 503 at its design point is shown in FIG. 13.

Assuming that the relative exit flow angle does not change, the characteristic for each section can be predicted as a line passing through (0,1) and the design point on the Smith chart. Thus the tip characteristic is predicted as line 1301, and the hub characteristic is predicted as line 1302. As can be seen both characteristics have a negative gradient which is indicative of high distortion tolerance and high stall margin. It should be noted that a typical turbofan fan will have a hub characteristic with a positive gradient, which would indicate that it would have low stall margin and low distortion tolerance.

Figure 14B:
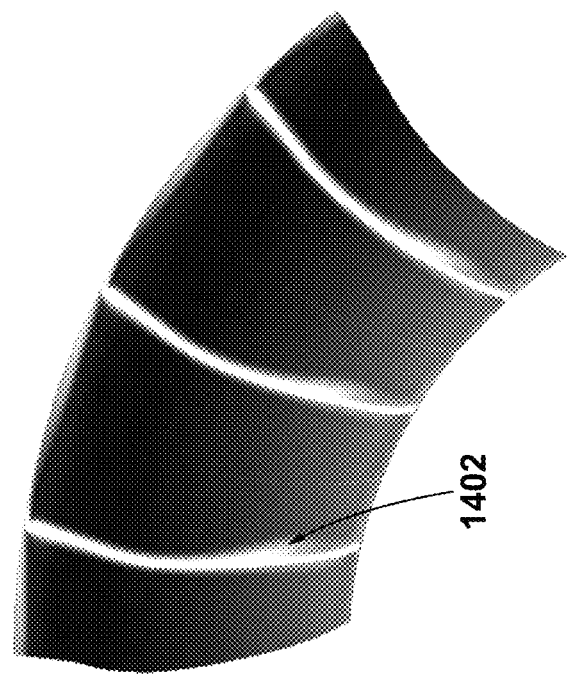
FIGS. 14A and 14B show, respectively, flow over a blade of the fan of FIG. 5, and the entropy distribution downstream of the fan.
Figure 14A:
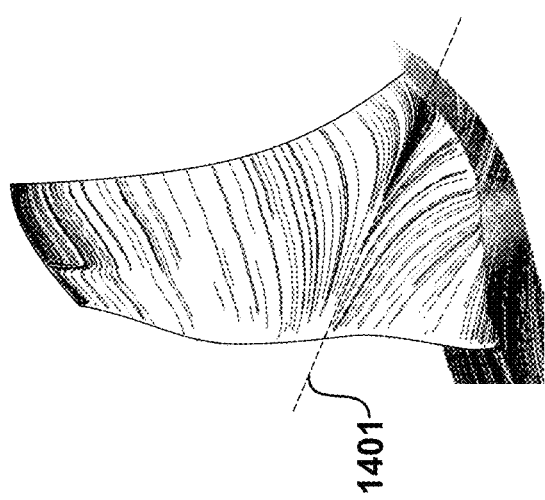

Surface streamlines and entropy contours downstream are plotted for the fan 503 in FIGS. 14A and 14B respectively.

It may be seen from FIG. 14A that there is a 3D separation at the hub, indicated by line 1401. The hub contraction illustrated in FIG. 5 reduces the static pressure rise coefficient and thus controls the severity of this separation. However, if the static pressure rise coefficient were to be reduced to the levels achieved on conventional turbofan fan blades then whilst the 3D separation would be removed, the hub contraction would become too extreme. The consequence of the 3D separation is however relatively small. This can be seen in the downstream entropy plot of FIG. 14B where a bulge 1402 in the wake makes it apparent where the separation sits.

Figure 15B:
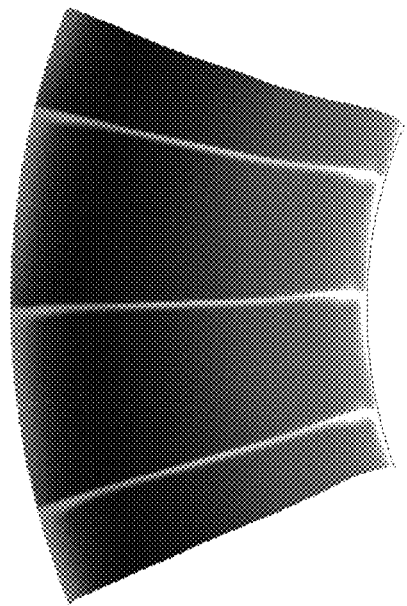
FIGS. 15A and 15B show, respectively, flow an outlet guide vane (OGV) of the BLI fan system of FIG. 4, and the entropy distribution downstream of the OGVs.
Figure 15A:
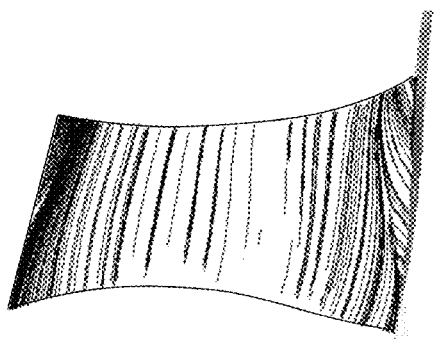

Surface streamlines and entropy contours downstream are plotted for the outlet guide vane set 504 in FIGS. 15A and 15B respectively.

The effect of the bulk acceleration and the hub contraction in the outlet guide vanes is to control the hub separation and keep the flow attached across the span.

Figure 16A:
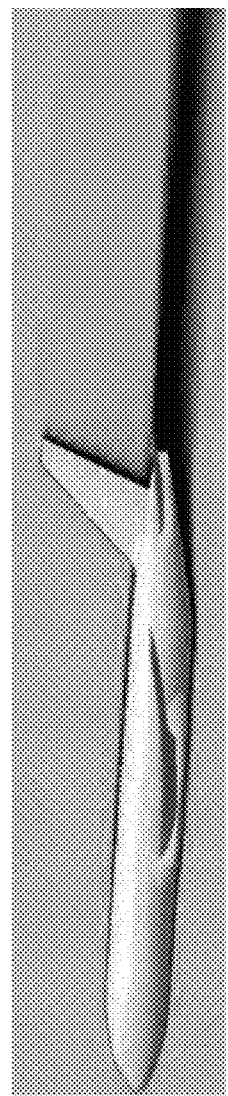
FIGS. 16A and 16B show, respectively, the pressure distribution of the aircraft of FIG. 1 without the BLI fan system and with the BLI fan system.
Figure 16B:
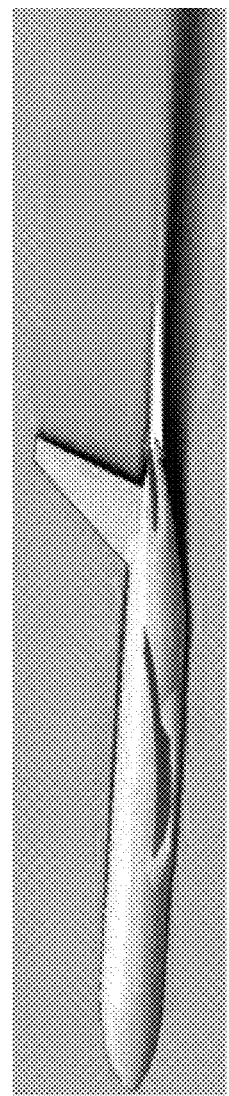

A comparison of the pressure field around the aircraft 101 and a similar aircraft albeit without BLI fan system 106, is shown in FIGS. 16A and 16B. The pressure field is illustrated relative to ambient pressure. The aircraft model simulation results of FIGS. 16A and 16B utilise the Common Research Model (CRM) made publically available by the National Aeronautics and Space Administration (NASA).

As can be seen in FIG. 16A, which is the predicted pressure field around the CRM aircraft without BLI fan system 106, there is a significant region of low-pressure wake. As can be seen from FIG. 16B, however, by adding the BLI fan system 106 to the CRM aircraft, a high-pressure plume is introduced which thus reduces the size and magnitude of low pressure following the aircraft, thereby improving overall propulsive efficiency.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A boundary layer ingestion fan system for location aft of the fuselage of an aircraft, comprising:
   a nacelle defining a duct;
   a fan located within the duct, the fan comprising a hub
      arranged to rotate around a rotational axis and a plurality of blades attached to the hub, each of which has a span from a root at the hub defining a 0 percent span position ($r_{hub}$) to a tip defining a 100 percent span position ($r_{tip}$) and a plurality of span positions therebetween ($r \in [r_{hub}, r_{tip}]$), wherein a flow coefficient is defined as a meridional velocity ($V_{mer}$) of each fan blade divided by a local rotational speed ($U_{local}$) of each fan blade, wherein a work coefficient is defined as a change in enthalpy (dh) divided by the square of the local rotational speed ($U_{local}$) of each fan blade, and wherein the work coefficient at the 0 percent span position ($r_{hub}$) decreases as the flow coefficient increases from 0 to 1, and the work coefficient at the 100 percent span position ($r_{tip}$) decreases as the flow coefficient increases from 0 to 1.

2. The fan system of claim 1, wherein each blade further has:
a blade thickness (t) defined at each span position which is normal to a chord of each blade and which is defined as a maximum distance between a pressure surface and a suction surface of each blade;
a blade inlet angle ($\beta_1$) at each span position which is the angle of a camber line at a leading edge relative to the rotational axis;
wherein a circumferential pitch (s) is defined at each span position between each one of said plurality of blades;
wherein a blade blockage, which is the ratio of the blade thickness to the product of the circumferential pitch and the cosine of the blade inlet angle ($t/s \cdot \cos\beta_1$), of 0.25 or greater at the 0 percent span position; and
wherein the blade blockage is 0.4 or greater at the 0 percent span position.

3. The fan system of claim 1, wherein each blade further has:
a blade thickness (t) defined at each span position which is normal to a chord of each blade and which is defined as a maximum distance between a pressure surface and a suction surface of each blade;
a blade inlet angle ($\beta_1$) at each span position which is the angle of a camber line at a leading edge relative to the rotational axis;
wherein a circumferential pitch (s) is defined at each span position between each one of said plurality of blades;
wherein a blade blockage, which is the ratio of the blade thickness to the product of the circumferential pitch and the cosine of the blade inlet angle ($t/s \cdot \cos\beta_1$), of 0.25 or greater at the 0 percent span position; and
wherein the blade blockage is 0.5 or greater at the 0 percent span position.

4. The fan system of claim 1, wherein each blade further has:
a blade thickness (t) defined at each span position which is normal to a chord of each blade and which is defined as a maximum distance between a pressure surface and a suction surface of each blade;
a blade inlet angle ($\beta_1$) at each span position which is the angle of a camber line at a leading edge relative to the rotational axis;
wherein a circumferential pitch (s) is defined at each span position between each one of said plurality of blades;
wherein a blade blockage, which is the ratio of the blade thickness to the product of the circumferential pitch and the cosine of the blade inlet angle ($t/s \cdot \cos\beta_1$), of 0.25 or greater at the 0 percent span position; and
wherein the blade blockage is 0.6 or greater at the 0 percent span position.

5. The fan system of claim 1, wherein each blade further has:
a blade thickness (t) defined at each span position which is normal to a chord of each blade and which is defined as a maximum distance between a pressure surface and a suction surface of each blade;
a blade inlet angle ($\beta_1$) at each span position which is the angle of a camber line at a leading edge relative to the rotational axis;
wherein a circumferential pitch (s) is defined at each span position between each one of said plurality of blades;
wherein a blade blockage, which is the ratio of the blade thickness to the product of the circumferential pitch and the cosine of the blade inlet angle ($t/s \cdot \cos\beta_1$), of 0.25 or greater at the 0 percent span position; and
wherein the blade blockage is 0.25 or greater over the inner 25 percent of span.

6. The fan system of claim 1, wherein each blade further has:
a blade thickness (t) defined at each span position which is normal to a chord of each blade and which is defined as a maximum distance between a pressure surface and a suction surface of each blade;
a blade inlet angle ($\beta_1$) at each span position which is the angle of a camber line at a leading edge relative to the rotational axis;
wherein a circumferential pitch (s) is defined at each span position between each one of said plurality of blades;
wherein a blade blockage, which is the ratio of the blade thickness to the product of the circumferential pitch and the cosine of the blade inlet angle ($t/s \cdot \cos\beta_1$), of 0.25 or greater at the 0 percent span position; and
wherein the blade blockage is 0.4 or greater over the inner 10 percent of span.

7. The fan system of claim 1, in which a hub-tip ratio of the fan, defined as the ratio of the diameter of the hub to the diameter of the fan measured at a leading edge of the blades, is from 0.45 to 0.55.

8. The fan system of claim 7, in which the hub-tip ratio of the fan is 0.5.

9. The fan system of claim 1, in which the hub has a negative hade angle ($\gamma$) with respect to the rotational axis at an axial position coincident with the leading edge of the blades.

10. The fan system of claim 9, in which the hade angle ($\gamma$) is between −10 and −20 degrees with respect to the rotational axis.

11. The fan system of claim 1, in which each one of the plurality of blades has a stagger angle at the 0 percent span position ($\zeta_{hub}$) relative to the rotational axis of 40 degrees or greater.

12. The fan system of claim 11, in which the stagger angle at the 100 percent span position ($\zeta_{tip}$) is 60 degrees or less.

13. The fan system of claim 11, in which the stagger angle ($\zeta$) at all span positions on each blade is 40 degrees or greater.

14. The fan system of claim 11, in which the stagger angle ($\zeta$) at all span positions on each blade is 60 degrees or less.

15. The fan system of claim 1, in which, for each one of said plurality of blades, a leading edge and a trailing edge thereof define, for each span position, a chord therebetween having a chord length (c), and a ratio of chord length at the 0 percent span position ($c_{hub}$) to chord length at the 100 percent span position ($c_{tip}$) is 1 or greater.

16. The fan system of claim 15, in which the ratio of chord length at the 0 percent span position ($c_{hub}$) to chord length at the 100 percent span position ($c_{tip}$) is 1.25 or greater.

17. The fan system of claim 15, in which the ratio of chord lengths (c) between the 0 and 25 percent span positions to the chord length at the 100 percent span position ($c_{tip}$) is 1 or greater.

18. The fan system of claim 15, in which the ratio of chord lengths (c) between the 75 and 100 percent span positions to chord length at the 100 percent span position ($c_{tip}$) is 1 or less.

19. The fan system of claim 1, in which a leading edge and a trailing edge define, for each span position, a chord therebetween having a chord length (c), and a ratio of blade thickness at the 0 percent span position ($t_{hub}$) to chord length at the 0 percent span position ($c_{hub}$) is 0.1 or greater.

20. The fan system of claim 19, in which, for each blade, a ratio of blade thickness at the 100 percent span position ($t_{tip}$) to chord length at the 100 percent span position ($c_{tip}$) is 0.02 or less.

* * * * *